United States Patent
McClatchie

(10) Patent No.: US 8,537,198 B2
(45) Date of Patent: Sep. 17, 2013

(54) DICHROIC CUT FILTER FOR WIDE-ANGLE IMAGING

(75) Inventor: Iain Richard Tyrone McClatchie, Los Altos, CA (US)

(73) Assignee: Google Inc., Mountain View, CA (US)

( * ) Notice: Subject to any disclaimer, the term of this patent is extended or adjusted under 35 U.S.C. 154(b) by 484 days.

(21) Appl. No.: 12/367,956

(22) Filed: Feb. 9, 2009

(65) Prior Publication Data

US 2009/0201360 A1 Aug. 13, 2009

Related U.S. Application Data

(60) Provisional application No. 61/027,338, filed on Feb. 8, 2008.

(51) Int. Cl.
*H04N 7/00* (2011.01)
(52) U.S. Cl.
USPC ............................................. 348/36; 348/39
(58) Field of Classification Search
USPC ...................................................... 348/36, 39
See application file for complete search history.

(56) References Cited

U.S. PATENT DOCUMENTS

| | | | |
|---|---|---|---|
| 3,278,752 A | 10/1966 | Brixner | |
| 4,686,986 A | 8/1987 | Fenyo et al. | |
| 5,954,633 A | 9/1999 | Hirata | |
| 6,225,244 B1 | 5/2001 | Oguma | |
| 6,462,866 B1 | 10/2002 | Sugiyama et al. | |
| 6,501,075 B1 * | 12/2002 | Trigiani | 250/302 |
| 7,339,747 B2 | 3/2008 | Yamamoto et al. | |
| 7,684,113 B2 | 3/2010 | Yamada et al. | |
| 2002/0101546 A1 * | 8/2002 | Sharp et al. | 348/760 |
| 2003/0197947 A1 * | 10/2003 | Obama et al. | 359/676 |
| 2004/0165095 A1 * | 8/2004 | Shimizu et al. | 348/335 |
| 2005/0018302 A1 | 1/2005 | Yano et al. | |

(Continued)

FOREIGN PATENT DOCUMENTS

| | | |
|---|---|---|
| CN | 101086546 A | 12/2007 |
| EP | 1701182 A1 | 9/2006 |

(Continued)

OTHER PUBLICATIONS

International Search Report and Written Opinion for PCT Application No. PCT/US2009/000806, mailed Jun. 4, 2009; 14 pages.

(Continued)

*Primary Examiner* — Minh-Chau Nguyen
(74) *Attorney, Agent, or Firm* — Sterne, Kessler, Goldstein & Fox P.L.L.C.

(57) ABSTRACT

An image device for wide-angle imaging may include an integrated optical system with a wide-angle dichroic cut filter. The dichroic cut filter may be an ultra-violet/infrared (UV/IR) cut filter to block UV and IR wavelengths of light and to transmit visible light. The dichroic cut filter is positioned adjacent to a surface of a lens in the optical system that receives rays of light at a substantially uniform angle of incidence along its surface. For example, the lens having the dichroic cut filter may receive all rays of light at an angle of incidence normal to the lens surface. The passband characteristics of the dichroic cut filter thus remain consistent for all rays of light. The dichroic cut filter may also be positioned near an aperture of the image device so as to direct retroreflected light away from the image sensor.

13 Claims, 9 Drawing Sheets

(56) References Cited

U.S. PATENT DOCUMENTS

| | | | |
|---|---|---|---|
| 2005/0179995 | A1 | 8/2005 | Nikolov et al. |
| 2005/0180014 | A1 | 8/2005 | Nikolov et al. |
| 2006/0050422 | A1 | 3/2006 | Ohshita et al. |
| 2006/0056070 | A1 | 3/2006 | Lee |
| 2006/0291061 | A1 | 12/2006 | Iyama et al. |
| 2007/0101398 | A1* | 5/2007 | Islam .......................... 725/151 |
| 2007/0177280 | A1 | 8/2007 | Hirayama |
| 2007/0285555 | A1* | 12/2007 | Chen ............................ 348/340 |
| 2007/0291365 | A1 | 12/2007 | Oshita et al. |
| 2009/0007177 | A1* | 1/2009 | Islam ............................ 725/39 |
| 2009/0080090 | A1 | 3/2009 | Maruyama |
| 2009/0087087 | A1* | 4/2009 | Palum et al. .................. 382/165 |

FOREIGN PATENT DOCUMENTS

| | | | |
|---|---|---|---|
| JP | 06-337350 | A | 12/1994 |
| JP | 2002 202455 | A | 7/2002 |
| JP | 2007/094032 | A | 4/2007 |

OTHER PUBLICATIONS

Office Action and Search Report issued on Aug. 2, 2012 in Chinese Patent Application No. 200980110735.7, McClatchie, I. et al., filed Feb. 9, 2009.

English language translation of Office Action and Search Report issued on Aug. 2, 2012 in Chinese Application No. 200980110735.7, China Sinda Intellectual Property Ltd. (Beijing, China), mailed Sep. 4, 2012.

English Language Abstract of Japanese Patent Publication No. JP 06-337350 A, Japanese Patent Office, Patent & Utility Model DB, Patent Abstracts of Japan, 1 page (listed as document FP3 on the accompanying form PTO/SB/08a).

Office Action mailed Feb. 8, 2013 in Russian Patent Application No. 2010134760, Federal Service for Intellectual Property, Moscow, Russia, pp. 1-6 (an English language summary of the Office Action is appended, pp. 7-8).

Partial Search Report for European Patent Application No. 13153479.4, European Patent Office, Munich, Germany, issued on May 2, 2013.

English Language Abstract for Japanese Patent Application Publication No. JP 2007/094032 A, Espacenet Patent Search, http://worldwide.espacenet.com/ (listed as document FP5 on the accompanying from PTO/SB/08a).

Notification of the Second Office Action, dated May 23, 2013, Chinese Patent Application No. 200980110735.7, The State Intellectual Property Office of the People's Republic of China, 15 pages (translation appended).

* cited by examiner

DICHROIC CUT FILTER FOR WIDE-ANGLE IMAGING

CROSS REFERENCE TO RELATED APPLICATION

This application claims the benefit of U.S. Provisional Application No. 61/027,338 (SKGF Ref. No. 2525.0820000), filed Feb. 8, 2008, titled "Dichroic Cut Filter for Wide-Angle Imaging," which is incorporated herein by reference in its entirety.

BACKGROUND

1. Field

Embodiments of the present invention generally relates to the field of imagery. More specifically, embodiments of the present invention refer to blocking undesirable wavelengths of light from reaching an image sensor and minimizing retroreflection in an image device.

2. Background

Dichroic cut filters are used in optical systems of image devices to selectively pass light of a specified range of wavelengths while reflecting other wavelengths. In image applications, a commonly-used dichroic cut filter is an ultraviolet/infrared (UV/IR) cut filter. UV/IR cut filters are used to block UV and IR wavelengths of light and to transmit visible light. Conventional UV/IR cut filters are thin films with varying refractive indices stacked on a transparent surface to achieve a particular wavelength frequency response.

The passband of a UV/IR cut filter may change depending on the angle of incidence of light impinging thereon. As the passband characteristics of the filter's transmission curve change with varying angles of incidence, the UV/IR cut filter may leak and transmit unwanted light to a detector when light is received outside of the optimal range of angles. The color fidelity of an image then becomes a greater issue. What is needed is a UV/IR cut filter that reduces transmission of unwanted wavelengths of light.

SUMMARY

In order to obtain an image with high color fidelity, attenuation of wavelengths of light outside of a UV/IR cut filter's passband must be increased. In an embodiment of the present invention, an apparatus for wide-angle imaging in an image device may include an integrated optical system with a wide-angle dichroic cut filter. Within the optical system, the dichroic cut filter may be positioned adjacent to a surface of a lens in the optical system and have a curvature such that the filter's surface is approximately normal to all chief rays of light. For example, the dichroic cut filter may be located on the surface of a lens that is near an aperture of the image device, wherein the lens receives chief rays of light at a normal angle of incidence along its surface. At this location, the dichroic cut filter may also minimize a retroreflection of light on an image sensor and direct the retroreflection of light away from the image sensor.

In another embodiment, a method for wide-angle imaging in an image device may include the following steps: receiving chief rays of light from an imaged object; and, directing the chief rays of light to an image sensor through an integrated optical system with a wide-angle dichroic cut filter. Further, the method for generating a wide-angle image with minimal retroreflection may also include directing retroreflected light away from the image sensor. In directing the light to the image sensor, a UV/IR cut filter may be positioned adjacent to a surface of a lens in the optical system to maintain a substantially consistent transmission curve for all chief rays of light received by the image device. This lens may receive chief rays of light at a substantially uniform angle of incidence along its surface.

Further embodiments, features, and advantages of the present invention, as well as the structure and operation of the various embodiments are described in detail below with reference to accompanying drawings.

BRIEF DESCRIPTION OF THE DRAWINGS

The present invention is illustrated by way of example, and not by way of limitation, in the figures of the accompanying drawings in which.

DETAILED DESCRIPTION

Figure 1:
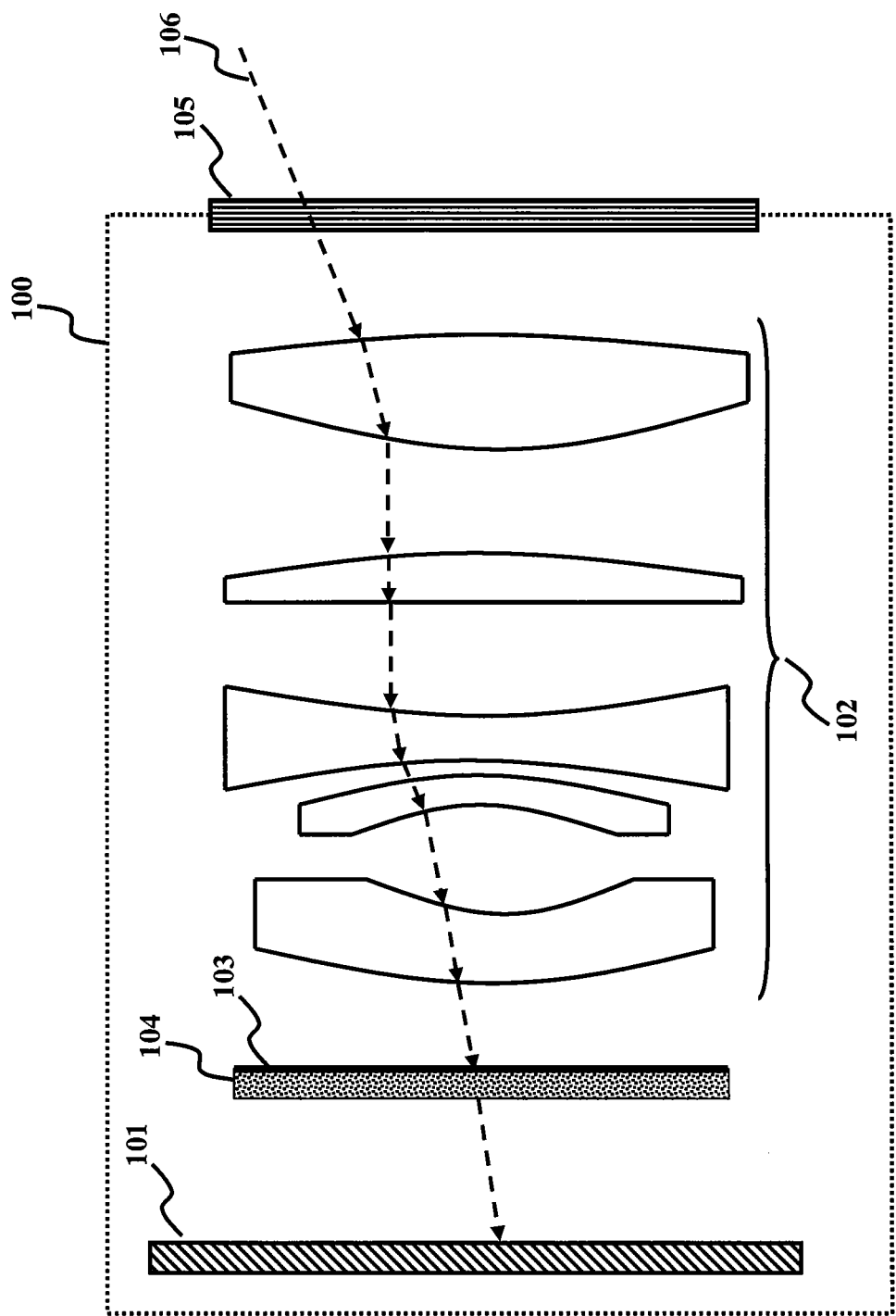
FIG. 1 illustrates a conventional image device with an optical system.

Dichroic cut filters are used in optical systems of image devices to selectively pass light of a specified range of colors while reflecting other colors. In image applications (e.g., high-resolution image applications), a commonly used dichroic cut filter is an ultra-violet/infrared (UV/IR) cut filter. An example dichroic UV/IR cut filter is a B+W 486 interference filter, which may be used for blocking ultra-violet (UV) and infrared (IR) wavelengths of light. UV/IR cut filters are used to block UV and IR wavelengths of light and to transmit visible light. Conventional UV/IR cut filters are thin films with varying refractive indexes stacked on a transparent surface to achieve a particular wavelength frequency response. FIG. 1 illustrates a conventional image device 100, where a UV/IR cut filter 103 is positioned along a surface of a transparent plate 104. In this lens configuration of FIG. 1, a chief ray of light 106 from an imaged object enters an aperture 105 of image device 100. Light 106 is directed towards image sensor 101 by an optical system 102, and then filtered by UV/IR cut filter 103 prior to receipt by image sensor 101 for further processing by image device 100.

Figure 2:
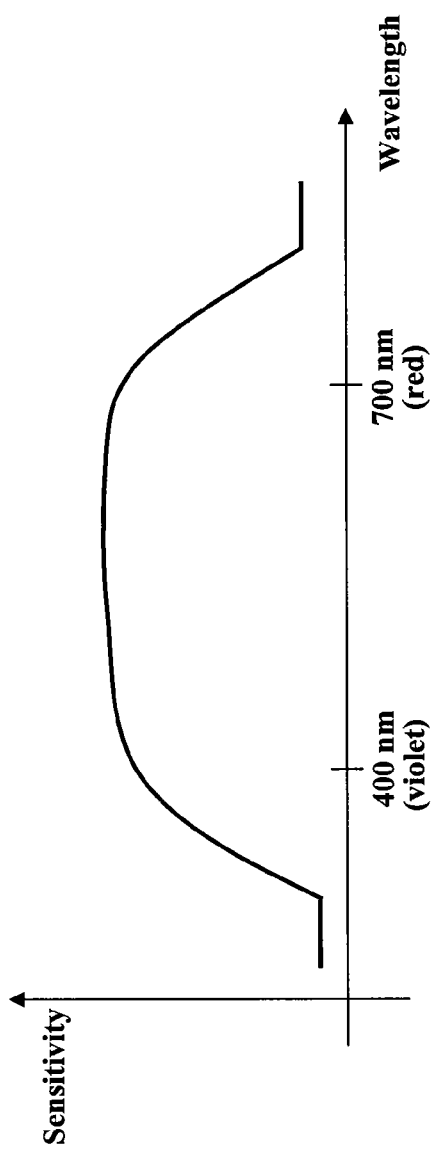
FIG. 2 illustrates an example of a transmission curve for an ultra-violet/infrared cut filter.

FIG. 2 illustrates an example transmission curve for UV/IR cut filter 103. The transmission curve in FIG. 2 passes colors of the visible light spectrum (e.g., 400 nm correlates to violet and 700 nm correlates to red) and attenuates wavelengths of light falling outside of the cut filter's passband. Although the attenuated wavelengths are not visible by the human eye, it is desirable to block these wavelengths because image device 100 is sensitive to these wavelengths and may still process the signal information.

Figure 3:
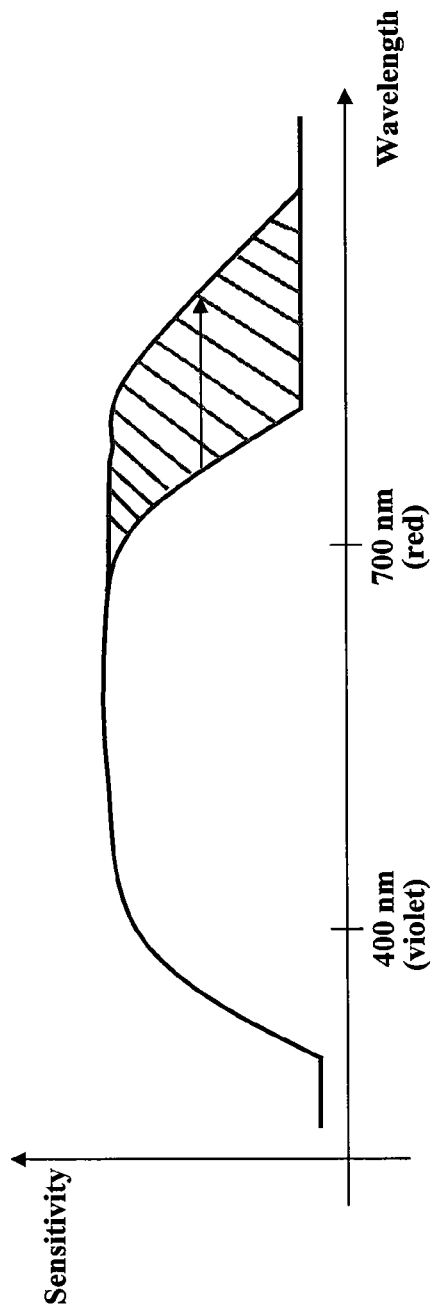
FIG. 3 illustrates an example of an expansion of a transmission curve for an ultra-violet/infrared cut filter due to a retroreflection of light onto a detector plane of an image sensor.

The transmission curve of UV/IR cut filter 103 varies with the angle of incidence at which a ray of light strikes the filter. For instance, if image device 100 is used to capture a wide-angle image, some rays of light from the image may enter cut filter 103 at an angle greater than an optimal angle. For these wide-angle images, the passband characteristics of the cut filter's transmission curve may expand and pass undesirable wavelengths of light onto image sensor 101. An example resulting transmission curve is illustrated in FIG. 3, where the wide-angle rays cause the filter to allow wavelengths of light greater than 700 nm to pass through and be processed by image sensor 101. In the example of FIG. 3, the light from UV/IR cut filter 103 may appear as a reddish color in the processed image generated by image device 100 due to the processing of wavelengths outside the visible spectrum.

Figure 4:
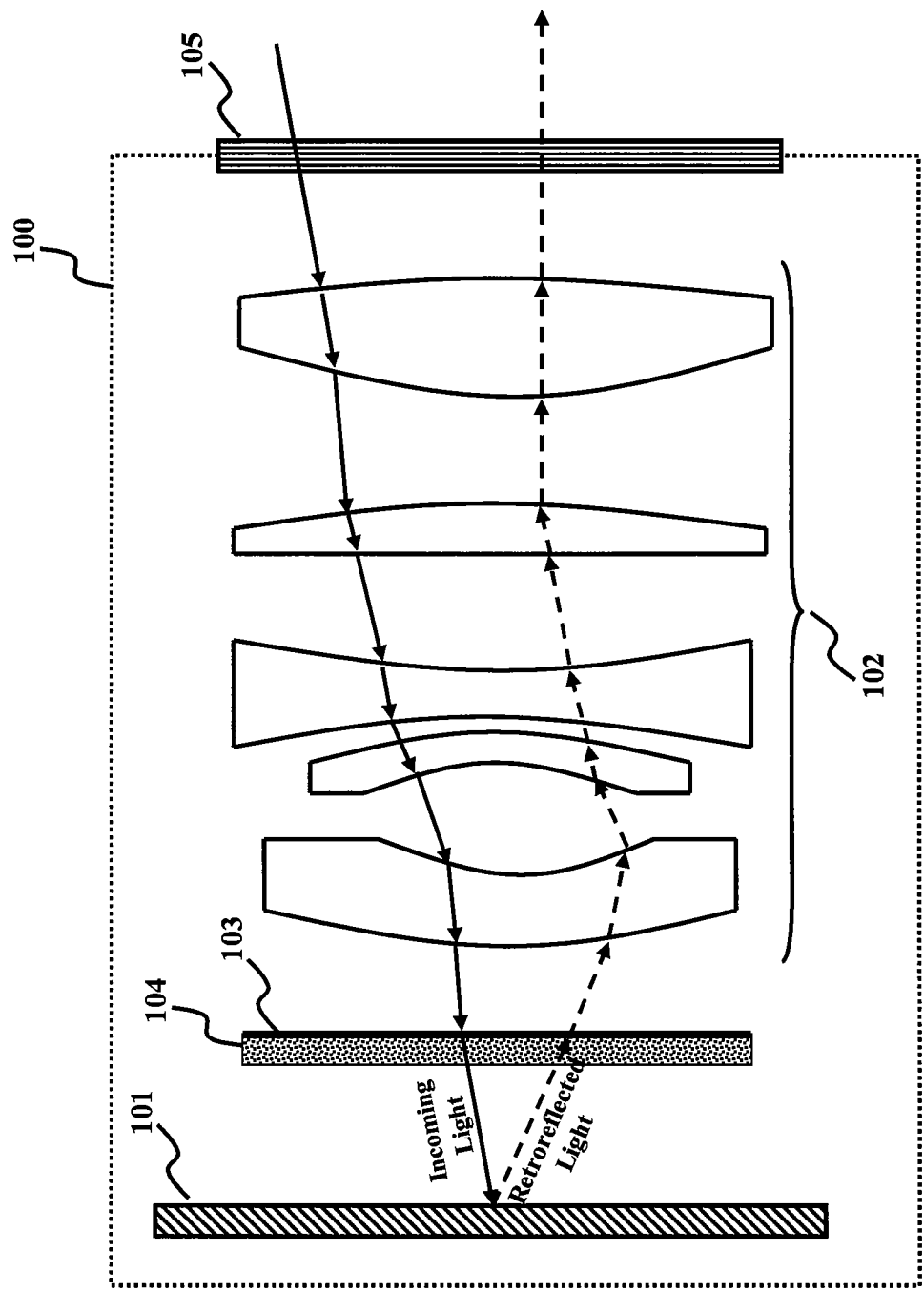
FIG. 4 illustrates a retroreflection of light from an imaged object traveling towards an aperture of a conventional image device.
Figure 5:
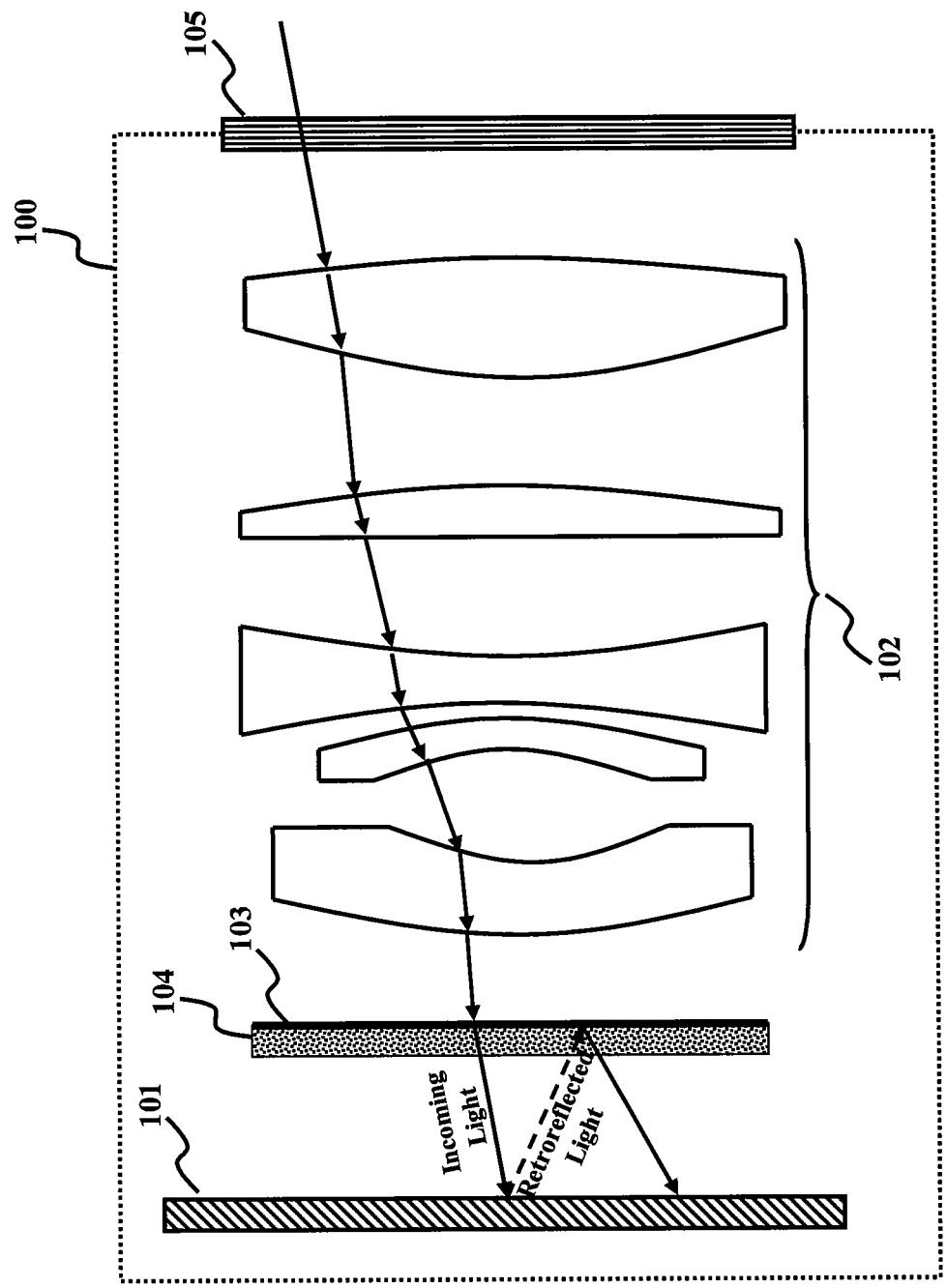
FIG. 5 illustrates a retroreflection of light from an imaged object traveling towards a detector plane of an image sensor in a conventional image device.

Additionally, a portion of the incoming light may reflect off a detector plane of image sensor 101. This effect is known as retroreflection, which refers to the reflection of light back to its source, independent of its angle of incidence. In image device 100, a retroreflection of light may travel along one of two paths. First, as illustrated in FIG. 4, incoming light may enter aperture 105, travel through optical system 102 and UV/IR cut filter 103, and strike the detector plane of image sensor 101. The incoming light may reflect off a detector plane of image sensor 101, pass back through optical system 102, and exit image device 100 through, for example, aperture 105. The reflection of light off image sensor 101 may be referred to as retroreflection. Second, as illustrated in FIG. 5, retroreflection may cause the light to be reflected back to UV/IR cut filter 103 at an angle of incidence different than the initial angle of incidence of the incoming light striking UV/IR cut filter 103. If the angle of incidence changes substantially, UV/IR cut filter 103 may not pass the retroreflected light back through optical system 102, but may instead reflect the retroreflected light back onto the detector. This may result in an undesirable image of the object.

Figure 6:
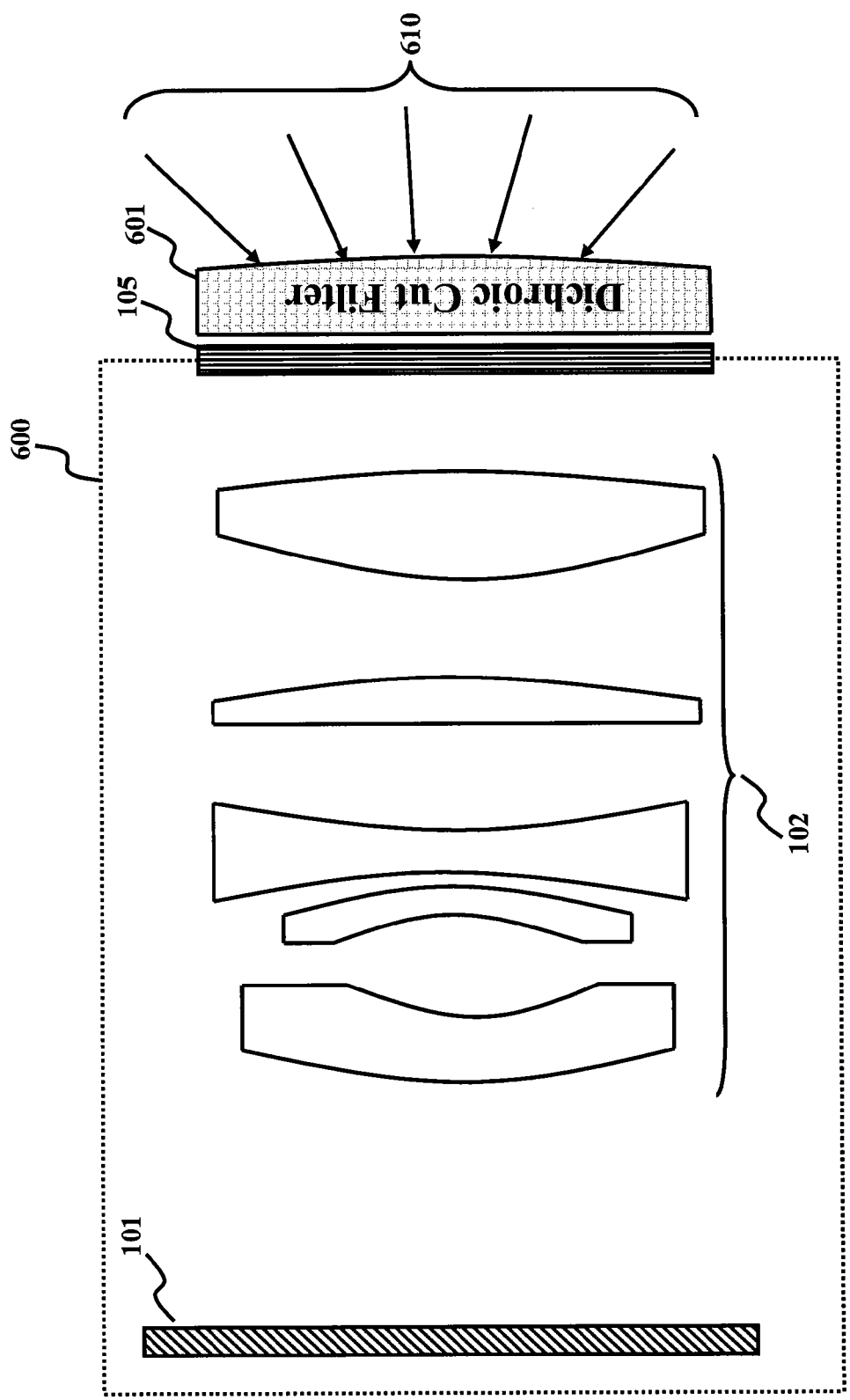
FIG. 6 illustrates a conventional image device with an external dichroic cut filter.

FIG. 6 illustrates another conventional image device 600 with an external dichroic UV/IR cut filter 601 coupled to its aperture 105. An example of external dichroic cut filter 601 is a B+W 486 interference filter, which may be used for blocking ultra-violet (UV) and infrared (IR) wavelengths of light. The B+W 486 interference filter may be mounted to aperture 105 of image device 600. Other external dichroic cut filters known to those skilled in the art may also be used.

A drawback of image device 600 is that light received by external dichroic cut filter 601 has a wide range of angles of incidence due to the filter's surface. FIG. 6 illustrates incoming rays of light 610 received by external dichroic filter 601 at varying angles of incidence. As a result of the wide range of angles of incidence of light 610, the transmission curve of external dichroic cut filter 601 shifts for each angle of incidence of each ray of light. As described with respect to FIG. 3, a shift in the transmission curve may pass undesired wavelengths of light onto image sensor 101 and, consequently, an image with inaccurate color may be generated by image device 600.

External dichroic filter 601 may be adequate for some imaging applications, but it would not be appropriate for applications involving wide-angle images. In using a lens in an image device's optical system, a wide-angle dichroic cut filter may be implemented while blocking undesired wavelengths of light from reaching an image sensor, minimizing retroreflection, and maintaining high color fidelity in the image.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In one embodiment, the apparatus and methods described herein may be used with various image devices such as digital single-lens reflex cameras and digital scanners. Alternatively, the apparatus and methods herein may be used with other types of image devices.

Figure 7:
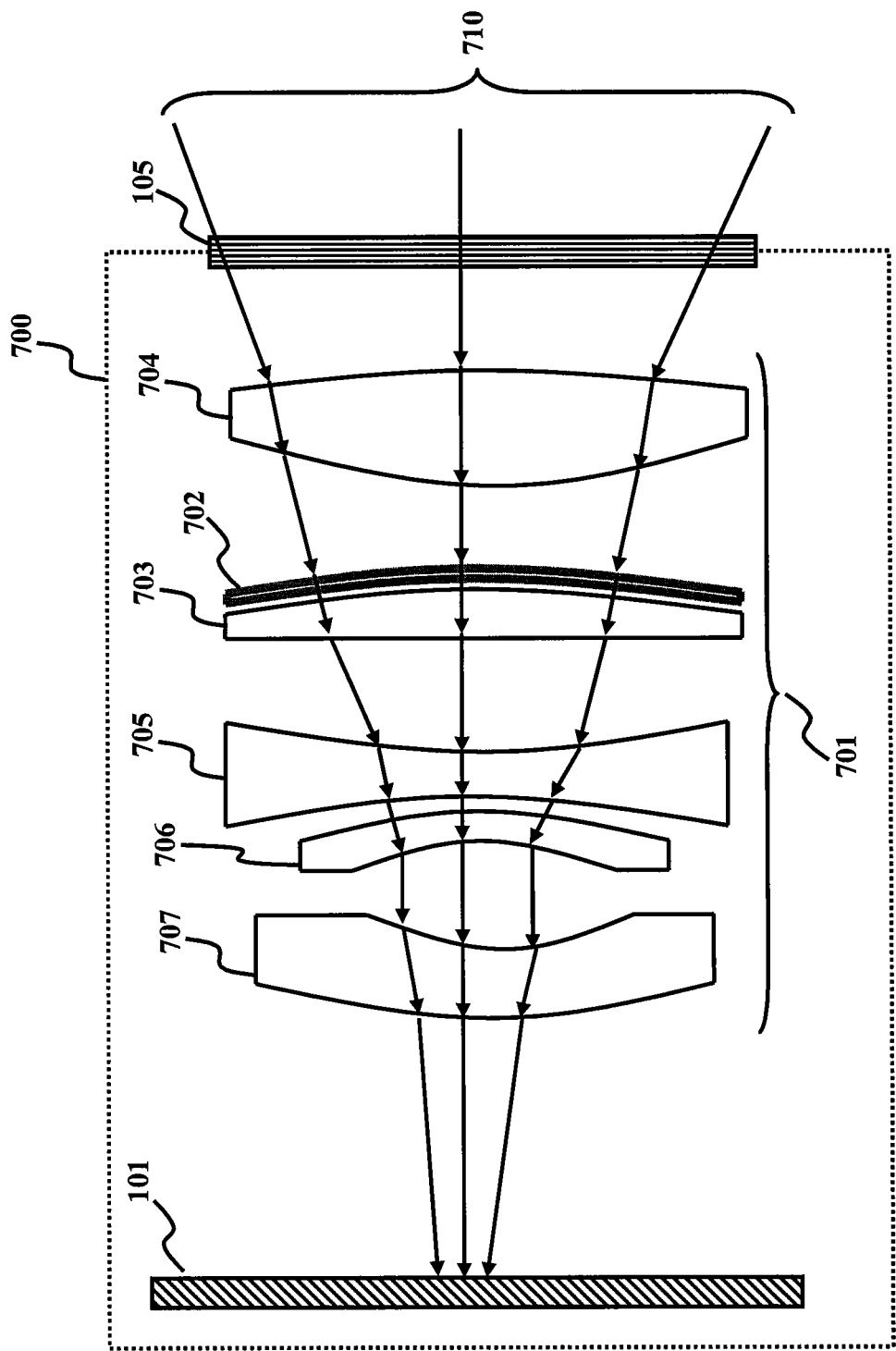
FIG. 7 illustrates one embodiment of an integrated optical system for wide-angle imaging in an image device.

FIG. 7 illustrates one embodiment of an image device 700 with an optical system 701 and a wide-angle dichroic cut filter 702. Optical system 701 is integrated in image device 700, where optical system 701 passes chief rays of light received from aperture 105 to image sensor 101. Optical system 701 may include one or more lenses 703-707 to receive chief rays of light from an imaged object and to project the chief rays of light onto a detector plane of image sensor 101. Optical systems are known to those skilled in the art.

Dichroic cut filter 702 may be used to selectively pass a specified range of wavelengths while reflecting other wavelengths. An example of dichroic cut filter 702 is a UV/IR cut filter, which is used to block UV and IR wavelengths of light and to transmit visible light. Alternatively, other dichroic cut filters may be used. The specific wavelengths of light mentioned in the description of image device 700 and optical system 701, and throughout this application, are given for example purposes only and are not meant to be limiting. Those skilled in the art will recognize other wavelength applications for image device 700 and optical system 701 based on the discussion herein. These other wavelength applications are within the scope and spirit of the present invention.

As illustrated in FIG. 7, dichroic cut filter 702 may be positioned adjacent to a surface of a lens 703 in optical system 701 such that dichroic cut filter 702 receives each chief ray of light at a substantially uniform angle of incidence along its surface. For example, dichroic cut filter 702 may receive each chief ray of light at an angle normal to the surface of dichroic cut filter 702. In one embodiment, dichroic cut filter 702 may include layers of thin films with varying refractive indexes disposed on the surface of a lens, such as lens 703. One of skill in the art will recognize that dichroic cut filter 702 may be disposed on any lens in optical system 701 have a surface that receives each chief ray of light at a substantially uniform angle of incidence along its surface. The passband characteristics of dichroic cut filter 702 may be dependent on the number of layers and the refractive index of each layer of film. The fabrication of dichroic cut filters along a surface of a lens or transparent plate is known to those skilled in the art.

Figure 8:
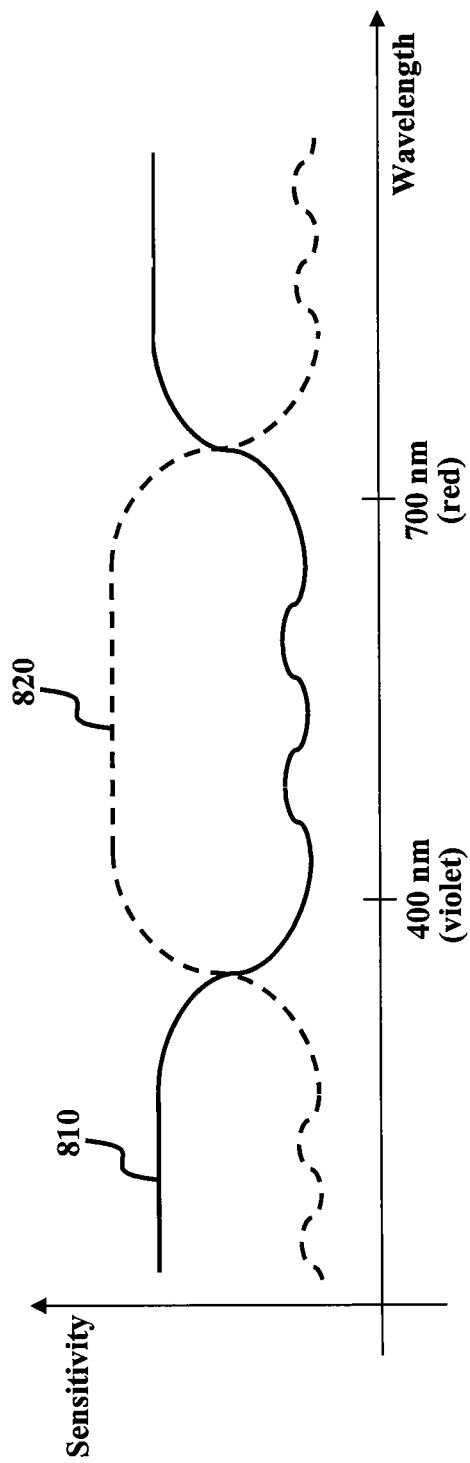
FIG. 8 illustrates an example of a signal characteristic of a broadband anti-reflective coating superimposed on a transmission curve of a dichroic cut filter.

In one embodiment, dichroic cut filter 702 may include a broadband anti-reflective (BBAR) coating. FIG. 8 illustrates an example of a signal characteristic of a BBAR coating 810 superimposed on a dichroic cut filter's transmission curve

820. The BBAR coating may be used to reduce a reflection of light at wavelengths within a passband of transmission curve 820. In particular, the signal characteristic of the BBAR coating 810 transmits light within the passband of transmission curve 820. Although the BBAR coating signal characteristic 810 may have a "ringing" effect within the passband of transmission curve 820, this ringing may be designed such that a negligible amount of light is reflected within the passband.

At the same time, the BBAR coating may be used to attenuate transmission of light at wavelengths outside of the passband of transmission curve 820 by reflecting such wavelengths away from image sensor 101. For example, as illustrated in FIG. 8, transmission curve 820 of the dichroic cut filter may have a ringing effect at wavelengths beyond its passband. This ringing effect may pass undesirable wavelengths of light onto image sensor 101. The BBAR coating may restrict these wavelengths of light from reaching the image sensor since, at these wavelengths, the signal characteristic of the BBAR coating 810 reflects light away from image sensor 101.

Returning to FIG. 7, lens 703 may receive chief rays of light 710 from an imaged object at a substantially uniform angle of incidence along its surface. In positioning dichroic cut filter 702 adjacent to the surface of lens 703, dichroic cut filter 702 also receives chief rays of light 710 at a substantially uniform angle along its surface. As a result, the characteristics of dichroic cut filter 702 have similar passband properties for all chief rays of light since the transmission curve for dichroic cut filter 702 depends on the angle of incidence of light striking the filter's surface.

For example, as chief rays of light 710 enter aperture 105 to be received by image sensor 101, light 710 enters lens 704. The curvature characteristics of lens 704 may adjust an angle of light 710 to strike dichroic cut filter 702 at a substantially uniform angle of incidence along the filter's surface. As a result, a transmission curve of dichroic cut filter 702 does not shift at varying points along the filter's surface due to different angles of incidence from light 710, as in previous systems.

Figure 9:
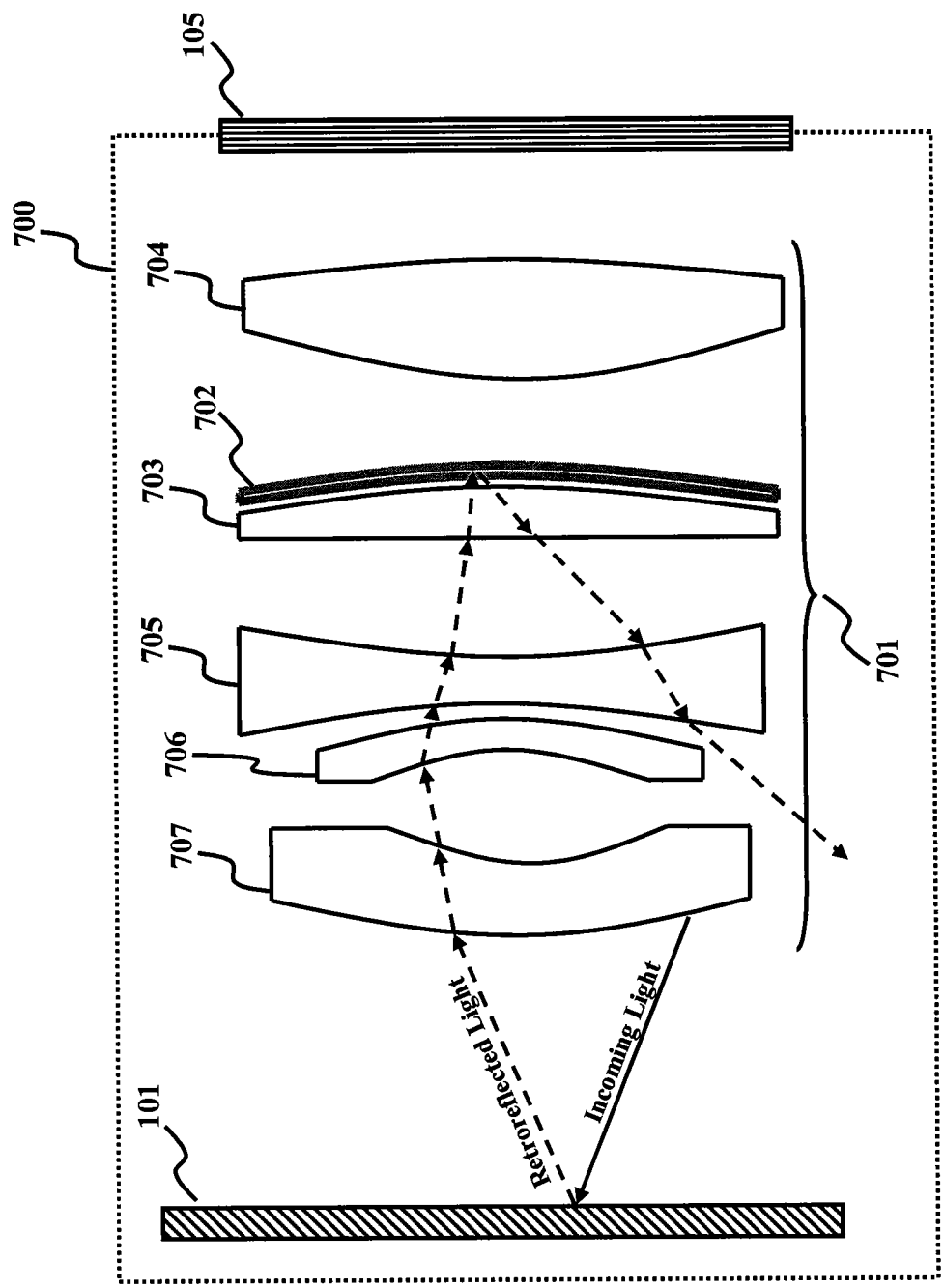
FIG. 9 illustrates a retroreflection of light from an imaged object in one embodiment of an integrated optical system for wide-angle imaging in an image device.

Further, dichroic cut filter 702 may be positioned near aperture 105 of image device 700, rather than close to image sensor 101. In positioning dichroic cut filter 702 at this location, dichroic cut filter 702 may minimize retroreflection of light in image device 700 in two ways. First, since dichroic cut filter 702 is a significant distance away from image sensor 101 (as compared to its distance from image sensor 101 in the conventional system of FIG. 1), retroreflection of light back onto image sensor 101 is minimized since the retroreflected light would need to travel through optical system 701 in order to reflect off dichroic cut filter 702. Second, as illustrated in FIG. 9, if the retroreflected light travels through optical system 701 and reflects off dichroic cut filter 702, the reflected light from dichroic cut filter 702 is likely to reflect away from image sensor 101 when striking a lens in optical system 701.

A person skilled in the art will appreciate that, in referring to FIG. 7, dichroic cut filter 702 may be placed on any lens in optical system 701, as long as the lens receives chief rays of light at a substantially uniform angle of incidence along its surface.

Image sensor 101 captures chief rays of light 710 from an imaged object to be further processed by image device 700. Image sensor 101 may capture light 710 through photosensitive diodes, called photosites, each of which represents a single pixel in the image generated by image device 700. The more light received by a photosite, the more photons it records. On the other hand, photosites capturing information from darker objects (e.g., shadows or a dark alley) will record fewer photons. The photons from each photosite may be counted and converted into a digital number, which represents the color of a single pixel. Using the pixel information captured by the photosites on image sensor 101, image device 700 may construct an image with color and brightness set by each pixel. An example of image sensor 101 is a charge coupled device (CCD) image sensor or a complementary metal oxide semiconductor (CMOS) image sensor. Alternatively, other image sensors may be used.

Figure 10:
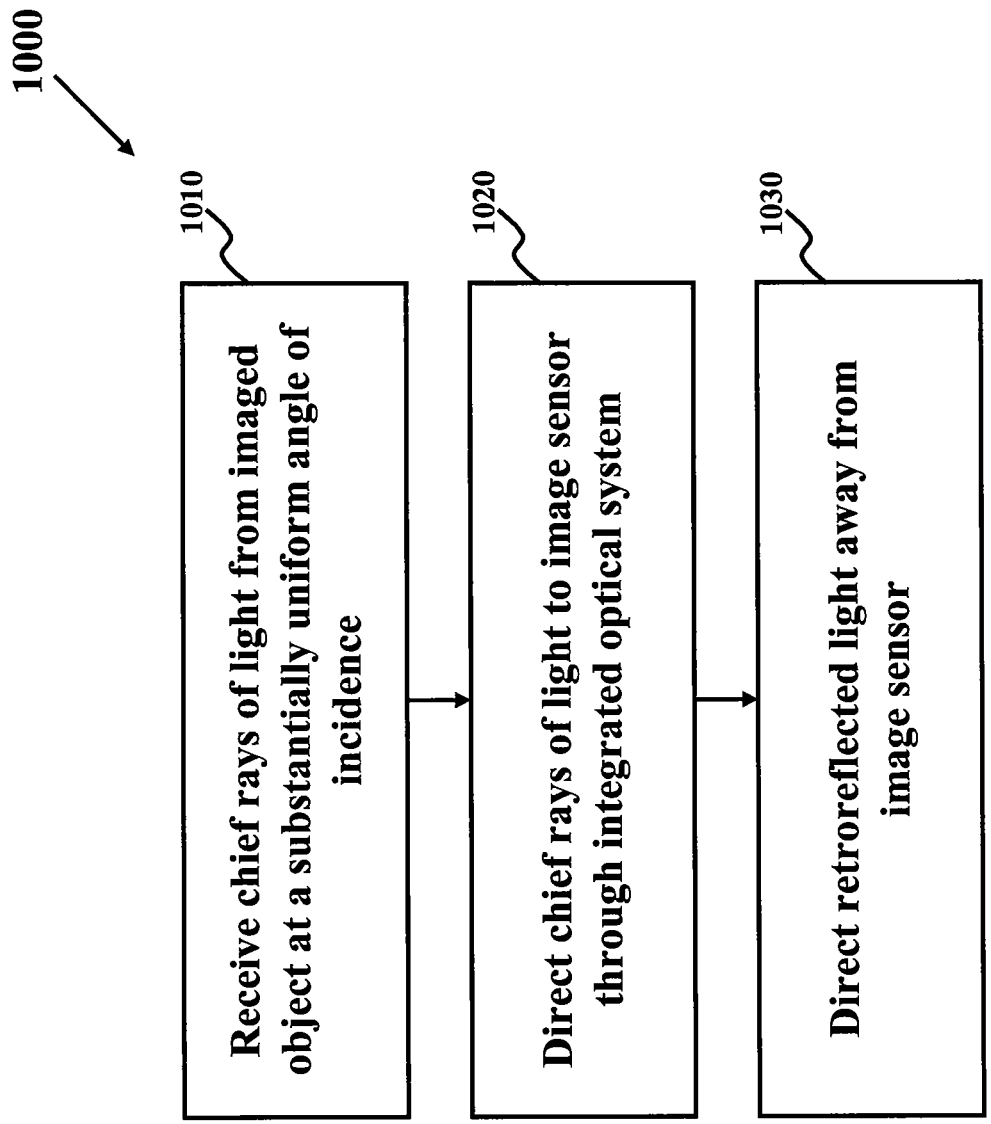
FIG. 10 illustrates one embodiment of a method for wide-angle imaging in an image device.

FIG. 10 illustrates one embodiment of a method 1000 for wide-angle imaging in an image device. Method 1000 may occur using, for example, image device 700. In step 1010, chief rays of light of an imaged object are received by the image device at a substantially uniform angle of incidence. The chief rays of light may be received by an integrated optical system through an aperture of the image device, wherein the integrated optical system includes a wide-angle dichroic cut filter. The integrated optical system may include one or more lenses to project the light onto a detector plane of the image sensor. Further, the wide-angle dichroic cut filter may be positioned adjacent to a lens in the optical system, such that the filter receives chief rays of light at a substantially uniform angle of incidence along its surface. The dichroic cut filter may be positioned along a surface of a lens such that the dichroic cut filter maintains a substantially consistent transmission curve for all chief rays of light received by the image device.

In step 1020, the chief rays of light of the imaged object are directed to an image sensor. The image sensor may be used to process the light, where photosensitive diodes may be used to capture chief rays of light from the imaged object. Each photosensitive diode may represent a single pixel in the image generated by the image device.

In step 1030, retroreflected light is directed away from the image sensor. The dichroic cut filter may be positioned near an aperture of the image device to minimize a retroreflection of light on the image sensor. In positioning the dichroic cut filter at this location, a retroreflection of light is unlikely to hit the image sensor due to the proximity of the dichroic cut filter from the image sensor. Additionally, in the event that a retroreflected light reflects off the dichroic cut filter, the retroreflected light is likely to reflect away from the image sensor when striking a lens in the optical system of the image device.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Accordingly, the breadth and scope of the present invention should not be limited by any of the above-described exemplary embodiments, but should be defined only in accordance with the following claims and their equivalents.

What is claimed is:

1. An apparatus for wide-angle imaging in an image device, comprising:
   an optical system integrated into the image device; and
   a wide-angle dichroic cut filter positioned on a curved surface of a lens in an interior of the optical system, wherein the lens is positioned to receive chief rays of light at a substantially uniform angle of incidence along its surface, and wherein retroreflected light is reflected away from an image sensor.

2. The apparatus of claim 1, wherein the dichroic cut filter comprises an ultra-violet/infrared (UV/IR) cut filter to block UV and IR wavelengths of light and to transmit visible light.

3. The apparatus of claim 2, wherein the UV/IR cut filter comprises a broadband anti-reflective coating to reduce a reflection of light at wavelengths within a passband of a transmission curve of the UV/IR cut filter and to attenuate light at wavelengths outside of the passband.

4. The apparatus of claim 1, wherein the optical system comprises one or more lenses positioned to receive chief rays of light from the imaged object and to project the chief rays of light onto a detector plane of the image sensor.

5. The apparatus of claim 1, wherein the dichroic cut filter is positioned near an aperture of the image device to minimize a retroreflection of light on an image sensor and to direct the retroreflection of light away from the image sensor.

6. The apparatus of claim 1, wherein the image device comprises at least one of a charge coupled device image sensor or a complementary metal oxide semiconductor image sensor.

7. A method for wide-angle imaging in an image device, comprising:
   receiving chief rays of light from an imaged object; and
   directing the chief rays of light to an image sensor through an integrated optical system with a wide-angle dichroic cut filter positioned on a curved surface of a lens in an interior of the optical system,
   wherein the lens is positioned to receive chief rays of light at a substantially uniform angle of incidence along its surface, and wherein retroreflected light is reflected away from the image sensor.

8. The method of claim 7, further comprising directing retroreflected light away from the image sensor.

9. The method of claim 8, wherein directing retroreflected light away from the image sensor comprises positioning a dichroic cut filter near an aperture of the image device to minimize a retroreflection of light on the image sensor.

10. The method of claim 7, wherein receiving chief rays of light from the imaged object comprises receiving chief rays of light through an aperture of the image device.

11. The method of claim 7, wherein receiving chief rays of light from the imaged object comprises configuring photosensitive diodes, each of which represent a single pixel in the image generated by the image device, to capture chief rays of light from the imaged object.

12. The method of claim 7, wherein directing the chief rays of light to the image sensor comprises using the optical system, with a plurality of lenses, to project the chief rays of light onto a detector plane of the image sensor.

13. The method of claim 7, wherein directing the chief rays of light to the image sensor comprises positioning a UV/IR cut filter adjacent to a surface of the lens to maintain a substantially consistent transmission curve for all chief rays of light received by the image device.

* * * * *